United States Patent [19]
Kuo et al.

[11] Patent Number: 5,313,545
[45] Date of Patent: May 17, 1994

[54] MOLDED WAVEGUIDE WITH A UNITARY CLADDING REGION AND METHOD OF MAKING

[75] Inventors: Shun-Meen Kuo, Chandler; Christopher K. Y. Chun, Mesa; Michael S. Lebby, Apache Junction, all of Ariz.

[73] Assignee: Motorola, Inc., Schaumburg, Ill.

[21] Appl. No.: 19,731

[22] Filed: Feb. 19, 1993

[51] Int. Cl.[5] ............................ G02B 6/10; G02B 6/30
[52] U.S. Cl. ........................................................ 385/129
[58] Field of Search .................. 385/129, 130, 132, 14

[56] References Cited

U.S. PATENT DOCUMENTS

| | | | |
|---|---|---|---|
| 4,203,649 | 5/1980 | Yelasco et al. | 385/132 |
| 4,262,995 | 4/1981 | Tangonan | 385/132 X |
| 4,765,702 | 8/1988 | Dohan et al. | 385/129 |
| 4,813,755 | 3/1989 | Mannschke | 385/129 |
| 5,061,029 | 10/1991 | Ishikawa | 385/132 |
| 5,136,678 | 8/1992 | Yoshimura | 385/132 |
| 5,175,790 | 12/1992 | Groh et al. | 385/143 |

*Primary Examiner*—Akm E. Ullah
*Attorney, Agent, or Firm*—Gary F. Witting; Eugene A. Parsons

[57] ABSTRACT

A method for molding optical waveguides (600) wherein one or more optical cores (230) are molded first with an attached support structure (206). A unitary cladding layer (601) is then molded around the cores (230) and the support structure (206) is removed to provide optical inlet/outlets to the cores (230). The ends of the cores (605) where the support structure (206) is removed may require subsequent polishing.

19 Claims, 5 Drawing Sheets

MOLDED WAVEGUIDE WITH A UNITARY CLADDING REGION AND METHOD OF MAKING

BACKGROUND OF THE INVENTION

This invention relates, in general, to waveguides and, more particularly, to fabrication of molded waveguides.

At the present time, fabrication of optical waveguides is achieved by either a polymer spin-on technique or a diffusion technique, both of which require expensive lithography steps. In addition, both fabrication techniques are ineffective and inefficient for fabricating optical waveguides in high volumes for several reasons, such as complex processing steps, difficulties in controlling the processing steps, and the high cost of doing these processing steps.

Briefly, as practiced by one method in the prior art, a polymeric film is spun onto a substrate. Portions of the polymeric film are subsequently exposed to light by a photolithographic process, thereby changing the refractive index of the polymeric film and creating a waveguide in the polymeric film. However, subsequent multi-step processing, such as removal of the polymeric film from the substrate, lamination processing, curing processing, and other processes typically are required for the waveguide to be useful. Further, it should be noted that each additional processing step incurs an additional cost, as well as presenting an opportunity to induce defects into the waveguide.

Alternatively, in another method practiced in the prior art, a layer such as a glass is applied to a substrate. The layer is patterned by a complicated lithography process, thereby producing portions that are masked and portions that are open or clear. Typically, ions are subsequently diffused into the open portions of the layer, thus changing the refractive index of the layer and making a waveguide. However, by using the photolithography process, a high cost is incurred into manufacturing of the waveguide. Also, by using diffusion processes to change the refractive index of the layer, control of dimensionality of the waveguide is severely limited.

It can be readily seen that conventional methods for making waveguides have severe limitations. Also, it is evident that conventional processing uses a multitude of steps which are not only complex and expensive, but also not effective processing. Therefore, a method for making a waveguide that provides a reduction in the number of steps required, reduces cost, and simplifies the process necessary for making a waveguide would be highly desirable.

SUMMARY OF THE INVENTION

Briefly stated, an article and method for making a molded optical waveguide is provided. A first optical portion and a support apparatus are molded, wherein the support apparatus holds the first optical portion. A second optical portion subsequently is molded that surrounds the first optical portion, thereby making a molded optical waveguide.

DETAILED DESCRIPTION OF THE DRAWINGS

Figure 1:
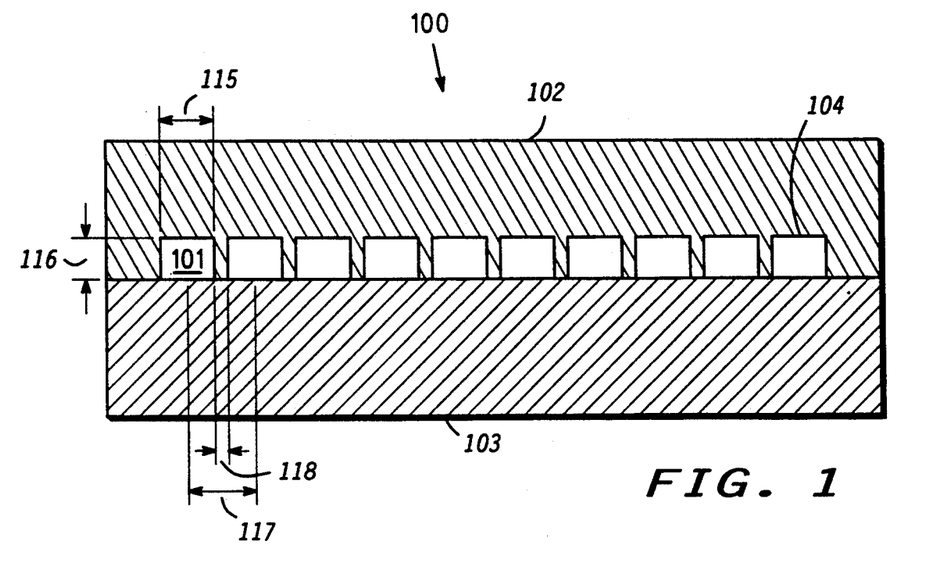
FIG. 1 is a simplified cross-sectional view of a mold used in the preparation of a waveguide.
Figure 2:
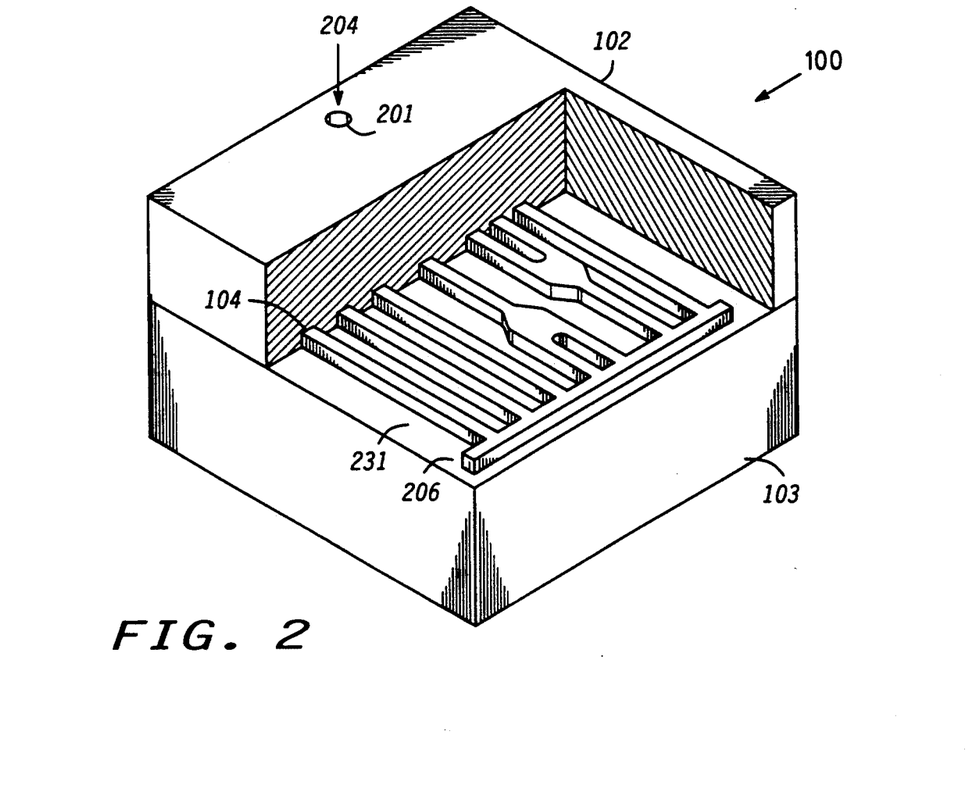
FIG. 2 is a simplified perspective view, a portion thereof cut-away of the mold shown in FIG. 1.

FIG. 1 is a simplified cross-sectional view of a mold 100 having a plurality of cavities 101 and FIG. 2 is a simplified perspective view with portions cut-away to better illustrate the inner construction of mold 100. It should be understood that mold 100 has been greatly simplified and that only a brief description of mold 100 is necessary for a clear understanding of the present invention. Typically, mold 100 is made of a top portion 102 and a bottom portion 103. Commonly, these top and bottom portions, 102 and 103, are made of any suitable material, such as stainless steel, aluminum, ceramic, or the like. Top and bottom portions 102 and 103 typically are machined so as to provide a desired form that is to be molded. Further, top and bottom portions 102 and 103 typically are configured so as to provide appropriate heating and cooling capacities, as well as providing necessary pressure capabilities that are dictated by selection of the molding materials or molding compounds.

Generally, with top portion 102 and bottom portion 103 securely held together and the appropriate process conditions selected for the specific molding compound or molding material, the molding material is injected into the plurality of cavities 101, represented by arrow 204 as shown in FIG. 2. Further, molding materials and molding compounds are injected into mold 100 through several openings only one of which is illustrated by an opening 201 in upper portion 102 of mold 100 in FIG. 2.

Features 104 of upper portion 102 of mold 100 are capable of being made in a variety of cross-sectional shapes and sizes, such as V-grooves, semi-circles, U-grooves, rectangular grooves, with a minimum feature size of approximately 0.5 micron or the like. Width 115 and height 116 are capable of being made with any suitable width and height that are desired depending generally upon specific application of the waveguide and materials used in fabrication of the waveguide. Furthermore, center to center spacing 117 is also capable of being made with any suitable spacing. In a preferred embodiment of the present invention, width 115 and height 116 are made such that a 50 micron by 50 micron feature 104 is defined respectively, with center-to-center spacing 117 being 250 microns, thus resulting in space 118 being 200 microns. However, it should be understood that alternative sizing for width 115, height 116, center-to-center spacing 117, and space 118 are capable of being used to adjust for increased density of features 104. For example, features 104 having width 115 and height 116 being 10 microns by 10 microns, respectively and space 118, between features 104, being 5 microns are capable of being manufactured, thus increasing a total number of features 104 being fabricated. Further, it should be understood that features 104 extend longitudinally into the paper and that many geometric patterns are capable of being fabricated with features 104, such as bending or curving of features 104, joining or splitting of features 104, or the like. Also, width 115 of features 104 is capable of being adjusted to meet specific design requirements, such as optical mode mixing, optical mode matching, or adiabatic tapering.

These geometric patterns are more fully illustrated in FIG. 2. As is shown in FIG. 2, a portion of upper portion 102 has been removed, thus exposing molded optical elements or core regions 230 and a support apparatus or a support structure 206. These optical elements or core regions 230 are connected to support structure 206 by end portions 231. Further, while only a portion of upper portion 102 of mold 100 is exposed, it should be understood that another support structure (not shown) is hidden from view that also supports core regions 230.

Typically, the molding compound injected into mold 100 is made of an optically transparent material, such as polymers, epoxies, plastics, polyimides, or the like that is selected to be transparent to a desired wavelength of light. Generally, refractive indexes of these optically transparent materials range from 1.4 to 1.7. However, in a preferred embodiment of the present invention, refractive indexes for the optically transparent materials used range from 1.54 to 1.58. Moreover, in a preferred embodiment of the present invention, optically transparent epoxies are used as the molding material. Processing conditions for these materials range from 22° C. to 200° C. for molding temperatures and 200 pounds per square inch to 2,000 pounds per square inch for molding pressures. By injecting the molding material, represented by arrow 204, into the plurality of cavities 101, intricacies of features 104 of mold 100 are transferred to the molding compound. A subsequent curing process solidifies the molding compound, thereby permanently transferring the intricacies or a negative image of the plurality of features 104 to the solidified molding compound, and thereby generating optical elements or core regions 230.

Once the curing processes are completed, mold 100 is opened and a molded first optical portion or first core regions 230, support apparatus 206, and end portions 231 are exposed. Subsequently, core regions 230, support apparatus 206 are removed from mold 100.

Additionally, support structure or support apparatus 206 is capable of being made to incorporate a handling apparatus (not shown). For example, the handling apparatus is capable of being made from a lead frame (not shown) having leads (not shown). The leads of the lead frame are inserted into mold 100 in an area defined by support structure 206 prior to injection of the molding compound. Upon completion of the molding process, the leads of the lead frame provide a method and an apparatus for handling or moving core regions 230.

Further, it should be understood that a post-mold curing process is sometimes needed to maximize optical and physical qualities of core regions 230, support apparatus 206, and end portions 231. The post-mold curing process typically is dependent upon the materials selected and used for molding. Typically, the post-mold curing processes are either an ultra-violet radiation treatment, a thermal cycle treatment, or a combination of both the ultra-violet and the thermal cycle treatment, thus more fully curing core regions 230 and support apparatus 206.

Figure 3:
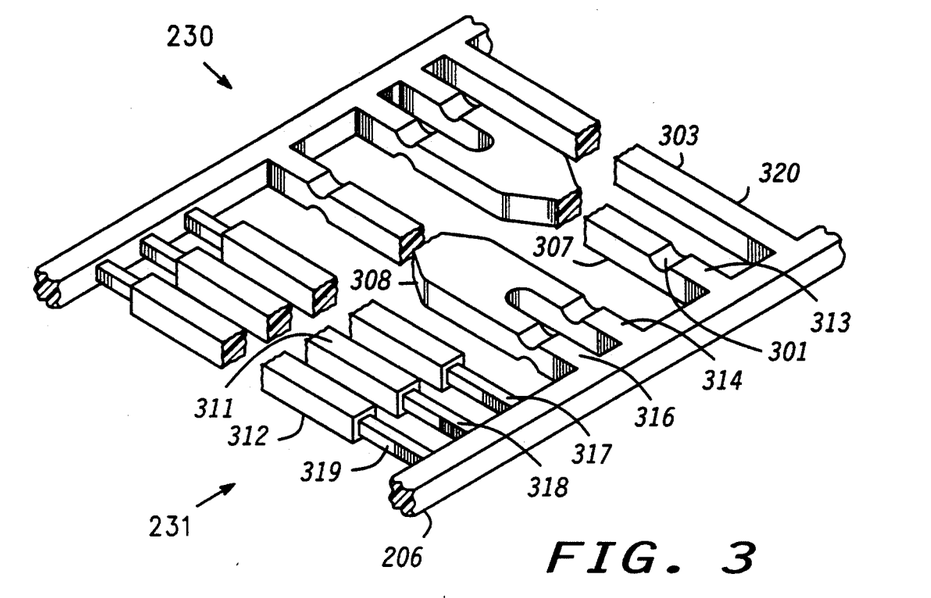
FIG. 3 is a simplified perspective view of a plurality of molded core regions illustrating several variations for detachment.

FIG. 3 is an enlarged perspective view of core regions 230 that has been molded illustrating end configurations in greater detail. Core regions 230 has now been removed from mold 100, thus illustrating each optical portion 303, 307, 308, 309, 311, and 312. End portion 320 of optical portion 303 illustrates a direct connection of end portion 320 to support structure 206. In this specific example, optical portion 303 and support structure 206 are both made in a rectangular format, thus end portion 320 connects to support structure 206 in a rectangular fashion. End portions 313, 314, 316, 317, 318, and 319 illustrate a variety of configurations for making aforesaid end portions 231. More specifically, end portions 313, 314, and 316 are made with grooves 301 that are indented into end portions 313, 314, and 316. Grooves 301 are made in such a manner such that a sufficient amount of material is removed so as to enhance cleaving or breaking off of end portions 313, 314, and 316 from optical portions 307 and 308, respectively. Additionally, end portions 317, 318, and 319 are made in an alternative configuration, wherein end portions 317, 318, and 319 are made by molding thin end portions 317, 318, and 319 so as to enhance removal of end portions 317, 318, and 319 from optical portions 309, 311, and 312. However, while only two specific examples of cleave enhancing geometries are described hereinabove, it is not the intent of these examples to be totally inclusive and it should be noted that other methods are capable of being used to enhance the cleaving or breaking off of end portions 313, 314, 316, 317, 318, and 319 from optical portions 307, 308, 309, 311, and 312.

More particularly and with reference to optical portions 307 and 308, optical elements 307 and 308 are fabricated with a Y-division or split, thus enabling light (not shown) to be split or divided into portions. While optical elements 307 and 308 each show only one split, it should be evident that multiple splits are capable of being formed, thus forming a tree structure and enabling light to be split many times.

Figure 4:
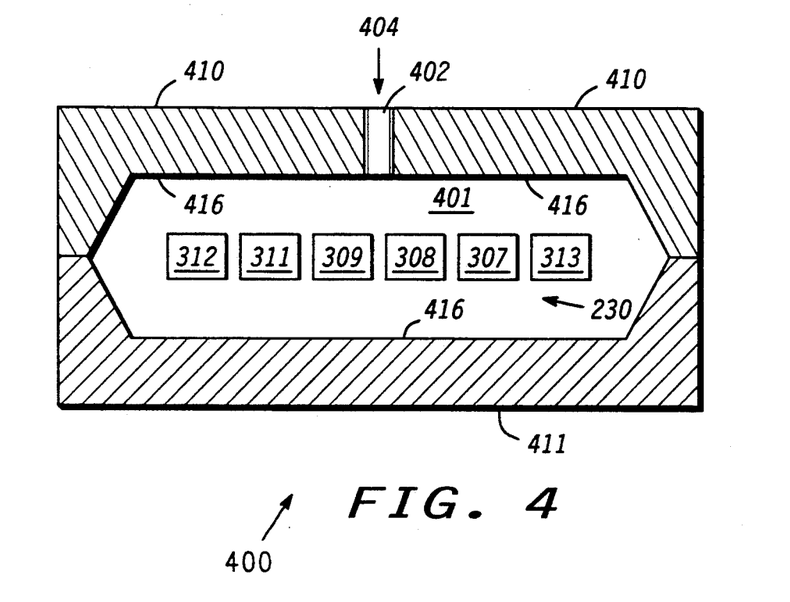
FIG. 4 is a simplified cross-sectional view of another mold used in the preparation of the waveguide.
Figure 6:
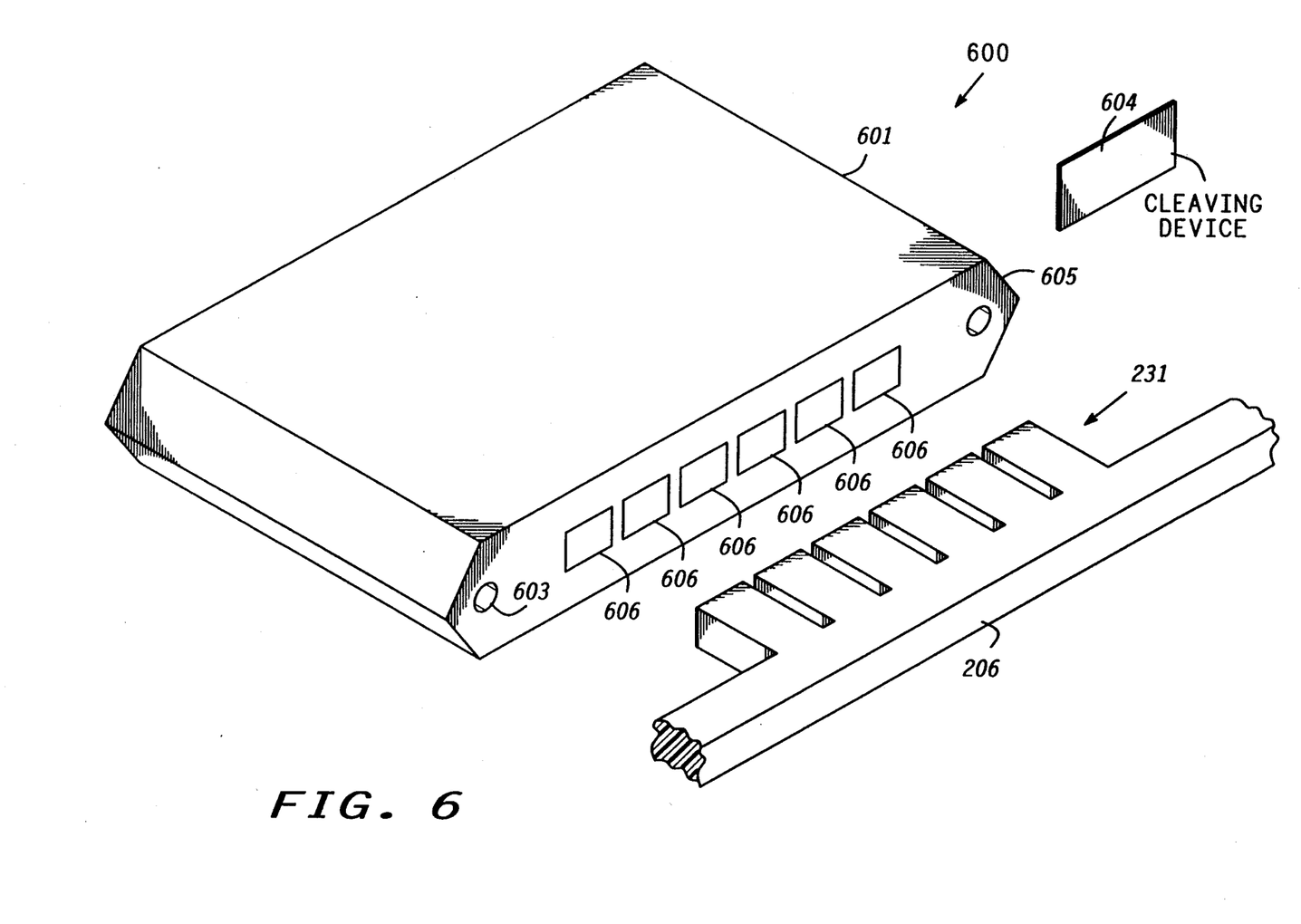
FIG. 6 is a simplified perspective view of a molded waveguide having core regions and cladding regions.

FIG. 4 is a simplified illustration of a cross-sectional view of a mold 400 used for making a second optical portion or a unitary cladding region 601 as illustrated in FIG. 6. Typically, mold 400 is made of an upper portion 410 and a lower portion 411.

Generally, as described with reference to FIG. 1 regarding mold 100, mold 400 is closed and brought to appropriate processing conditions. The molding material is injected into cavity 401, illustrated by arrow 404, through opening 402, thus filling cavity 401. By filling cavity 401 with an appropriately selected molding compound, the molding compound surrounds and adheres to optical portions 303, 307, 308, 309, 311, and 312 that are suspended and held by mold 400. Further, the molding compound replicates and takes on the shape of interior surfaces 416 of mold 400, thus enabling an appropriate shape to be molded that can be further used as is discussed hereinafter. Also, as previously described with reference to FIG. 1, molding compound 404 is cured, solidified, and subsequently removed from mold 400, thereby providing a unitary cladding layer 601 as shown in FIG. 6.

Typically, molding materials or molding compounds used for injection into mold 400, as illustrated by arrow 404, are made of optically transparent material. However, it should be understood that in some specific applications structural additives, such as silicate and silicon dioxide, are added to provide additional strength to unitary cladding region 601 as illustrated in FIG. 6. In addition, it should be noted that addition of these structural additives are capable of making the molding compounds translucent or opaque. Generally, the optical molding compound is made of any suitable material, such as polymers, epoxies, plastics, polyimides, or the like that is selected to be transparent to a desired wavelength of light. Typically, refractive indexes of these optical materials range from 1.4 to 1.7. However, it should be understood that to form an optical waveguide the refractive index of core region 230 must be at least 0.01 greater than the refractive index of unitary cladding layer 601 as shown in FIG. 6. In present invention, unitary cladding region 601 surrounds core region 230, thus totally surrounding core region 230 and providing an improved cladding capability. Injection of molding compound is done in such a manner so as to completely surround core regions 230, thereby providing a unitary cladding region 601 as shown in FIG. 6.

Figure 5:
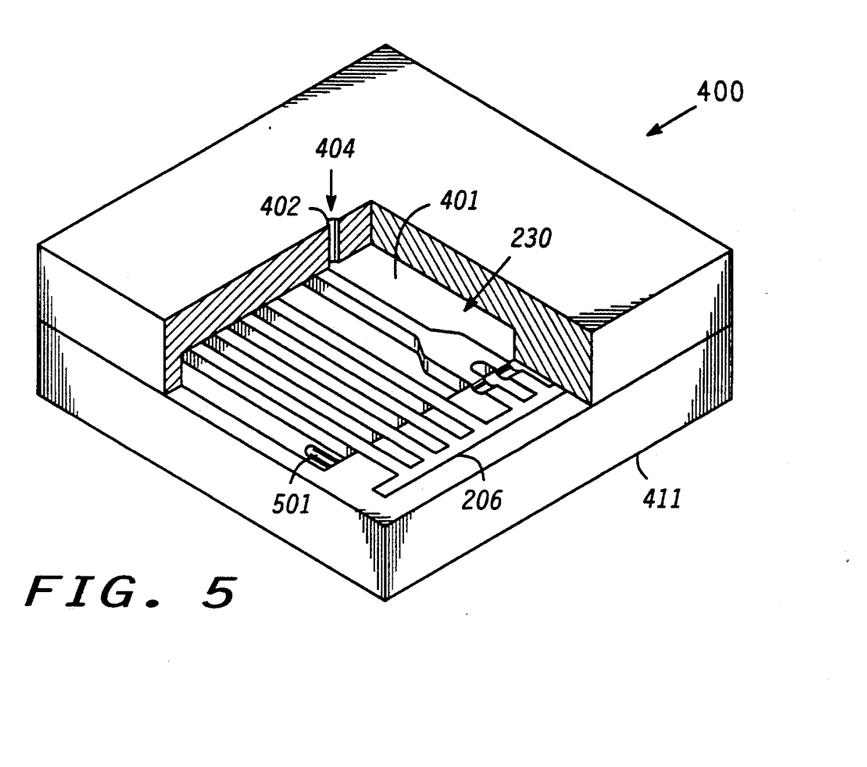
FIG. 5 is a simplified perspective view, a portion thereof cut-away of the mold shown in FIG. 4.

FIG. 5 is a simplified perspective view with a portion cut-away to better illustrate the inner construction of mold 400. As can be seen in FIG. 5, support structure 206 is used to suspend core region 230 inside cavity 401, thus enabling injection of molding compound, as illustrated by arrow 404 into cavity 401. Generally, support structure 206 and associated core regions 230 are detachably affixed into mold 400 so as to suspend core regions 230 throughout cavity 401 of mold 400. By suspending core regions 230 throughout cavity 401, the molding compound is able to easily surround core regions 230, thus providing a superior cladding region 601 as shown in FIG. 6. Further, retractable pins 501 are provided in mold 400 so as to enable molding of alignment guides or alignment ferrules 603 as shown in FIG. 6. Typically, retractable pins 501 are capable of being configured in a variety of shapes, such as circular, octagon, and triangular. Moreover, retractable pins 501 are capable of being threaded, thus threading alignment guides 603 during molding of unitary cladding region 601. It should be understood that when retractable pins 501 are threaded a rotational motion of retractable pin 501 is necessary to unthread retractable pin 501 from unitary cladding region 601. It should be further understood that providing alignment guides 603 with threads is capable of being achieved by machining.

FIG. 6 is a simplified enlarged perspective view of molded waveguide 600 with a unitary cladding region 601. Generally, upon completion of curing processes, as described herein above, waveguide 600, support structure 206, and associated end portions 231 are removed from mold 400. Typically, removal of support structure 206 and associated end portions 231 from waveguide 600 is achieved by any suitable means, such as cleaving, breaking, sawing, or the like. Removal of support structure 206 and the associated end portions 231 may be enhanced by the end configurations as described hereinabove. Additionally, removal of support structure 206 and associated end portions 231 are capable of being removed by a sawing or cleaving device 604 that is used to cut across surface 605, thus leaving optical core regions 606 with a clear, smooth surface. It should also be evident that cleaving device 604 typically is an automated device such as robotic arm, or the like. Alternatively, and at times in conjunction with, core regions 606 are required to be polished to an optically smooth surface. Polishing of core surfaces 606 typically is achieved by either a wet polishing wheel or a dry polishing wheel. Polishing processes are capable of being physical processes, chemical processes, or a combination of both physical and chemical processes. For example, core surfaces 606 are mechanically pressed onto a wheel containing a slurry mixture (not shown) on a pad (not shown) that has a rotational movement, side to side motion, or vibrational motion, or any combination thereof, thus mechanically and chemically polishing core surfaces 606.

By way of example only, a first optical portion or core regions 230, end portions 231, and support structure 206 are made by injecting a transparent epoxy molding compound into mold 100. Temperature of the mold 100 ranges between 40 degrees Celsius to 200 degrees Celsius with a preferred temperature range from 100 degrees Celsius to 165 degrees Celsius. Molding pressure ranges from 500 pounds per square inch (psi) to 1,400 psi with a preferable pressure range between 800 psi to 1,000 psi. Typically, curing time is a function of temperature and pressure, thus having a wide range of times. However, it should be understood that any suitable curing procedure is capable of being used, such as thermal curing, ultraviolet light curing, or any combination thereof. Upon completion of forming core regions 230, end portions 231, and support structure 206 are removed from mold 100 and further cured if needed.

Core regions 230, end portions 231, and support structure 206 subsequently are placed into mold 400 and overmolded, thus fabricating second optical portion or unitary cladding region 601. Regarding this specific example, overmolding is accomplished by injecting an epoxy molding compound into mold 400. Temperature of mold 400 ranges between 150 degrees Celsius to 175 degrees Celsius with a preferred temperature range from 160 degrees Celsius to 165 degrees Celsius. Molding pressure of mold 400 ranges between 500 psi to 1,000 psi with a preferred pressure range from 750 psi to 800 psi. Typically, transfer times range from 30 to 50 seconds at a temperature of 150 degrees Celsius to 20 to 30 seconds at a temperature of 175 degrees Celsius. Curing time typically ranges from 3 to 5 minutes at 150 degrees Celsius to 2 to 4 minutes at a temperature of 175 degrees Celsius. Upon completion of the curing time, the second optical portion 601 that overmolds first optical portion 230 is removed from mold 400. Typically, a post-curing step is necessary in order to achieve maximum properties of the molding compounds. Once the post-curing step is accomplished, support structure 206 and associated end portions 231 are removed by passing cleaving device 604 along surface 605, thus generating a clean smooth surface along surface 605.

Figure 7:
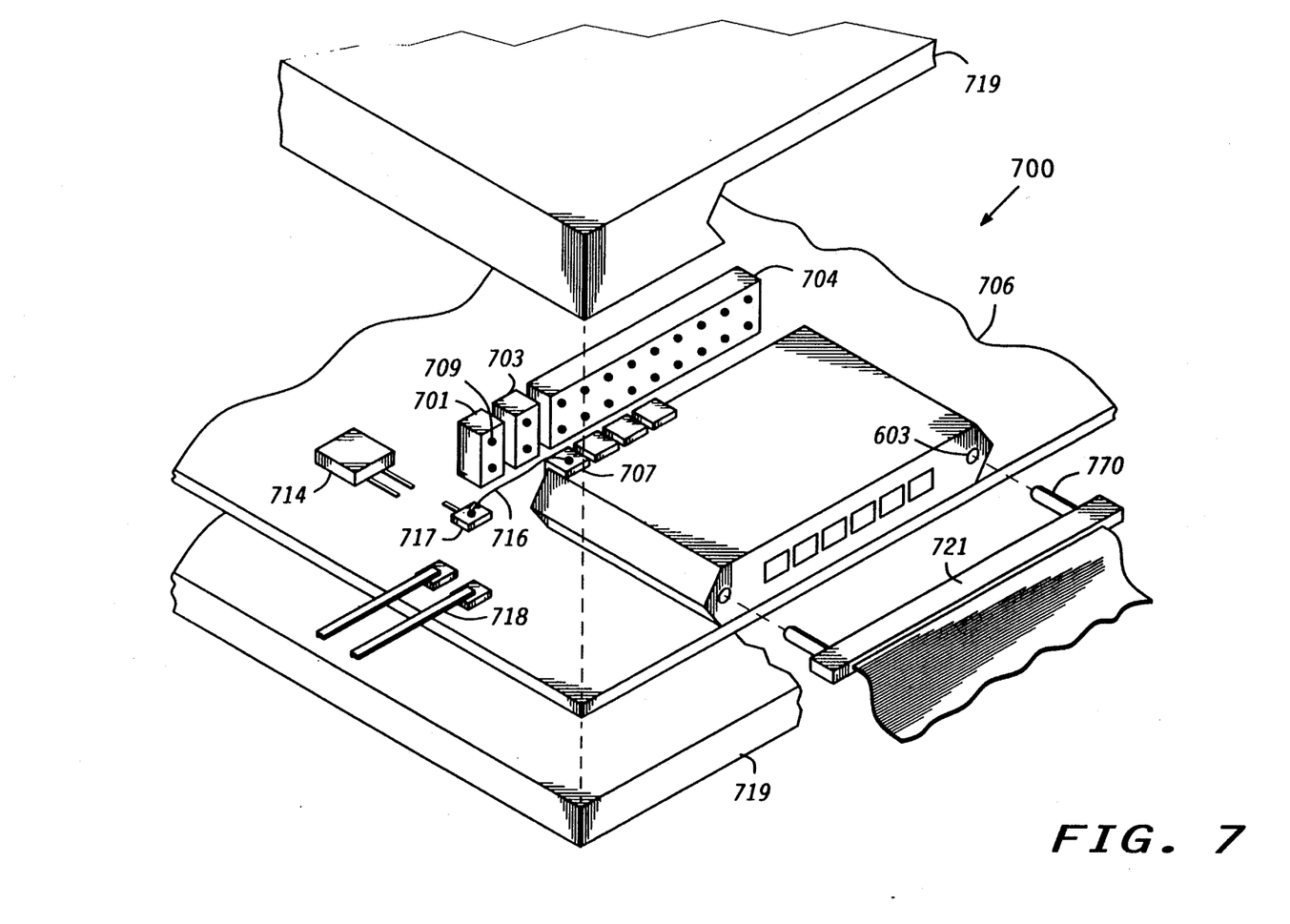
FIG. 7 is a partially exploded simplified pictorial view of an optical electronic module utilizing the molded waveguide of FIG. 6.

FIG. 7 is a simplified partially exploded pictorial view of an optical electronic module 700. In the present invention, molded optical waveguide 600 is electrically coupled to standard electronic components on an interconnect board 706.

Typically, waveguide 600 is fitted with optical components such as a phototransmitter or laser, a photodetector or photodiode 703, or a combination of both lasers and detectors. Alternatively, an array 704 is capable of being mounted on waveguide 600 which contains a variety of optical components. The optical components are mounted to molded optical waveguide 600 in such a manner that individual working portions of the optical components are aligned to an individual waveguide, thus providing maximum light transmission through individual waveguides. For example, laser 701 is mounted to tab 707 and a tab (not shown) by electrical and mechanical connection 709. Typically, electrical and mechanical connection 709 is achieved by any suitable method, such as solder bumps or conductive adhesives. By accurately placing laser 701 to molded optical waveguide 600 and making electrical and mechanical connection 709, light transmission from a working portion of laser 701, which is guided through waveguide 600, is maximized.

Generally, molded optical waveguide 600 with attached optical components is attached to interconnect board 706. Several methods may be used for attaching interconnect board 706 to molded optical waveguide 600, such as adhering, press fitting, molding, or the like. However, in a preferred embodiment of the present invention, epoxy adhesive is applied to interconnect board at an approximate location where the molded optical waveguide 600 and the interconnect board 706 are to be bonded. Waveguide 600 is placed onto the adhesive by an automated system such as robot arm, thereby providing accurate placement and orientation of waveguide 600.

Subsequent electrical coupling of standard electrical components, on interconnect board 706 to optical components is achieved by wire bond 716 from bonding pad 717 to tab 707. It should be evident by one skilled in the art, that many more electrical couplings typically are necessary to fully utilize inputs and outputs of both the standard electrical components and the optical components. It should be further evident that standard output and input means, represented by leads 718, are used to couple other components as well.

Further, plastic encapsulation of integrated circuit board 706 and molded optical waveguide 600 typically is achieved by an overmolding process, represented by plastic pieces 719, which encapsulates interconnect board 706 and optical waveguide 600 while leaving alignment ferules 603 open and clear of debris. Alignment ferules 603 are then engaged by alignment pins 720 of optical fiber ribbon 721, thereby providing accurate and repeatable alignment of optical fiber ribbon 721 to optical waveguide 600.

By now it should be appreciated that a novel method for making a molded optical waveguide and an optical electronic module have been described. The method allows for the making of optical waveguides in a cost effective manner, thus allowing their usage in optical electronic modules to be cost effective. Additionally, this method allows for an inexpensive process for combining both standard electrical components and optical components.

We claim:

1. A method for making a molded waveguide comprising the steps of:
    molding a first support apparatus, a second support apparatus, and a core region simultaneously, the core region attaches to and extends between the first support apparatus and the second support apparatus; and
    molding a unitary cladding region surrounding the core region, thereby making a molded waveguide.

2. A method for making a molded waveguide as claimed in claim 1 further comprising the step of:
    removing at least the first support apparatus from the core region of the waveguide, thereby separating the at least first support apparatus from the core region of the waveguide and generating a separated region on the waveguide.

3. A method for making a molded waveguide as claimed in claim 2 further comprising the step of: polishing the separated region on the waveguide, thereby generating an optical surface at the separated region on the waveguide.

4. A method for making a molded waveguide as claimed in claim 1 wherein the step of molding a first support apparatus, a second support apparatus, and a core region is achieved by using a molding compound selected from one of the following materials: a polymer material, a plastic material, a polyimide material, or an epoxy material.

5. A method for making a molded waveguide as claimed in claim 1 wherein the sep of molding a unitary cladding region surrounding the core region is achieved by using a molding compound selected from one of the following materials: a polymer material, a plastic material, a polyimide material, or an epoxy material.

6. A method for making a molded waveguide as claimed in claim 1 further including the step of molding an alignment guided into the unitary cladding region.

7. A method for making a molded waveguide comprising the steps of:
    molding a first optical portion having a plurality of core regions, a first support structure, and a second support structure; wherein the plurality of core regions are attached to and extend between the first support structure and the second support structure, thereby holding the plurality of core regions;
    molding a second unitary optical portion that overmolds the plurality of core regions with the second unitary optical portion while leaving portions of the support structure exposed, thereby generating a unitary cladding region that surrounds the plurality of core regions; and
    detaching at least the first support structure from the plurality of core regions making detached areas on the plurality of core regions, thereby generating a molded optical waveguide.

8. A method for making a molded waveguide as claimed in claim 7 further comprising the step of:
    polishing the detached areas on the plurality of core regions, thereby generating an optical surface at the detached areas on the plurality of core regions of the molded optical waveguide.

9. A method for making a molded waveguide as claimed in claim 7 wherein the plurality of core regions have an optical refraction greater than the cladding region.

10. A molded optical waveguide comprising:
    a molded first optical portion having a plurality of molded core regions, the plurality of molded core regions each having a first end and a second end that are formed in a single molding step; and
    a molded unitary optical portion that surrounds the plurality of molded core regions, wherein the first end and the second end of the plurality of molded core regions is exposed from the molded unitary optical portion, where the plurality of molded core regions are clad by the unitary optical portion that surrounds the plurality of molded core regions.

11. The molded optical waveguide as claimed in claim 10 further including an alignment guide molded into the molded unitary optical portion.

12. The molded optical waveguide as claimed in claim 10 wherein the refractive index of the first optical portion is at least 0.01 greater than the refractive index of the molded unitary optical portion.

13. The molded optical waveguide as claimed in claim 10 wherein the molded first optical portion is made from selecting a material from one of the following: a polymer material, a plastic material, a polyimide material, or an epoxy material.

14. The molded optical waveguide as claimed in claim 10 wherein the molded unitary optical portion is made from selecting a material from one of the following: a polymer material, a plastic material, a polyimide material, or an epoxy material.

15. An optical electronic module comprising:

an interconnect board having standard electronic components with an output pad and output leads;

a molded optical waveguide including a molded core region surrounded by a unitary cladding region, and an optical component with a working portion, the optical component being mechanically and electrically connected to the molded optical waveguide such that the working portion of the optical component is aligned to the core region of the molded optical waveguide which is mounted to the interconnect board; and means for electrically connecting the output pad of the standard electronic components to the optical component, thereby interconnecting the standard electronic components to the optical component.

16. An optical electronic module as claimed in claim 15 wherein the means for connecting the output pad to the optical component is achieved by wire bonding.

17. An optical electronic module as claimed in claim 15 wherein the optical component is a phototransmitter.

18. An optical electronic module as claimed in claim 15 wherein the optical component is a photodetector.

19. An optical electronic module as claimed in claim 15 further comprising an alignment guided molded into the molded unitary optical portion.

* * * * *